(12) United States Patent
Mashitani et al.

(10) Patent No.: US 7,646,907 B2
(45) Date of Patent: Jan. 12, 2010

(54) STEREOSCOPIC IMAGE GENERATING DEVICE AND STEREOSCOPIC IMAGE DELIVERY METHOD

(75) Inventors: Ken Mashitani, Osaka (JP); Goro Hamagishi, Osaka (JP); Satoshi Takemoto, Gifu (JP); Keiji Horiuchi, Gifu (JP); Yoshihiro Hori, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 563 days.

(21) Appl. No.: 10/538,513

(22) PCT Filed: Dec. 15, 2003

(86) PCT No.: PCT/JP03/16052

§ 371 (c)(1),
(2), (4) Date: Apr. 7, 2006

(87) PCT Pub. No.: WO2004/056133

PCT Pub. Date: Jul. 1, 2004

(65) Prior Publication Data

US 2006/0204075 A1    Sep. 14, 2006

(30) Foreign Application Priority Data

Dec. 16, 2002    (JP) .............................. 2002-364396

(51) Int. Cl.
*G06K 9/00*    (2006.01)

(52) U.S. Cl. .......................... 382/154; 345/419; 348/42

(58) Field of Classification Search ................ 348/49, 348/56, 42, 44, 43, E13.014, E13.071, 348, 348/E13.033, E13.038, E13.022, E13.029, 348/E13.073, E13.025, E13.059, 51, E13.064, 348/E13.072, E13.037, E13.03, E13.049, 348/E13.05, E13.061, E13.044, E13.062, 348/E13.007, E13.008, E13.039, E13.034, 348/E13.053, E13.048, 578, 580, E5.055, 348/E13.005, E1.063, E13.043; 359/478, 359/471, 464, 888, 900, 479, 462, 477, 480; 345/7, 419, 426; 378/41; 352/57, 86, 213, 352/43, 60, 45, 46; 382/154
See application file for complete search history.

(56) References Cited

U.S. PATENT DOCUMENTS

| | | | |
|---|---|---|---|
| 5,629,798 A * | 5/1997 | Gaudreau ................... 359/465 |
| 6,062,693 A * | 5/2000 | Sato .............................. 353/7 |
| 6,278,480 B1 * | 8/2001 | Kurahashi et al. ............. 348/59 |
| 6,490,364 B2 * | 12/2002 | Hanna et al. ................. 382/107 |
| 6,853,357 B2 * | 2/2005 | Inoue et al. ..................... 345/9 |
| 2003/0043262 A1 * | 3/2003 | Takemoto et al. ............. 348/46 |

FOREIGN PATENT DOCUMENTS

| | | |
|---|---|---|
| EP | 1 049 069 A2 | 11/2000 |
| EP | 1 089 573 A2 | 4/2001 |
| EP | 1 150 254 A2 | * 10/2001 |
| JP | 06-062438 | * 3/1994 |
| JP | 08-289327 | 11/1996 |
| JP | 08-331605 | 12/1996 |
| JP | 09-023451 | 1/1997 |
| JP | 2000-078611 | 3/2000 |

OTHER PUBLICATIONS

Supplementary European Search Report issued in European Patent Application No. EP 03778931.0-2202/1578142 PCT/JP0316052, dated Jun. 29, 2009.

* cited by examiner

*Primary Examiner*—Sheela Chawan
(74) *Attorney, Agent, or Firm*—McDermott Will & Emery LLP

(57) ABSTRACT

When "0" indicating that intensity of a stereoscopic effect is the lowest is applied as a stereoscopic effect tag, a stereoscopic image is allowed to be displayed as it is. On the other hand, when "1, 2, and 3" are applied as the stereoscopic effect tag, a reduction ratio is determined depending on a value of the stereoscopic effect tag (one-half, one-third, etc.). On the basis of this reduction ratio, the stereoscopic image is displayed and letters of "warning" are displayed. A user selects whether to display the stereoscopic image according to a producer's intention or to maintain the size-reduced stereoscopic image. If an operation requiring for a display of the stereoscopic image as it is intended by the producer is performed, an original stereoscopic image is displayed.

7 Claims, 5 Drawing Sheets

STEREOSCOPIC IMAGE GENERATING DEVICE AND STEREOSCOPIC IMAGE DELIVERY METHOD

TECHNICAL FIELD

The present invention relates to a stereoscopic image generating device and a stereoscopic image delivery method.

PRIOR ART

There is proposed a stereoscopic image receiver and a stereoscopic image system that generate a stereoscopic image on the basis of depth information extracted from a two-dimensional video signal and the two-dimensional video signal (see Japanese Patent Laying-open No. 2000-78611).

With the above-described prior art, it is possible to generate a stereoscopic vision-use image having parallax information from a photographed two-dimensional image. Incidentally, it is probable that a viewer might feel uncomfortable when the viewer is suddenly shown a stereoscopic image having an intense stereoscopic effect. On the other hand, a producer side of a stereoscopic image work, considering the nature of the work, has a desire to allow the viewer to view the stereoscopic image with the intense stereoscopic effect.

SUMMARY OF THE INVENTION

In view of the foregoing circumstances, it is an object of the present invention to provide a stereoscopic image generating device and a stereoscopic image delivery method capable of allowing a stereoscopic image work to be viewed as intended by a producer without making a viewer feel uncomfortable toward the stereoscopic image work.

In order to solve the above-mentioned problem, a stereoscopic image generating device of the present invention comprises a means for detecting information indicating stereoscopic effect intensity added to a stereoscopic image to be displayed, a means for displaying a stereoscopic image by rendering a size smaller than an original-size based on the information indicating the stereoscopic effect intensity of the stereoscopic image and requiring an input indicating whether or not to allow an original-size stereoscopic image, and a means for executing a display of the original-size stereoscopic image when receiving information indicating an allowance from a user side.

With the above-described configuration, a stereoscopic image is displayed by rendering a size smaller than its original size at first. As a result, even if a stereoscopic image work has an intense stereoscopic effect, the stereoscopic effect is rendered weak, and it is possible to prevent a viewer from feeling uncomfortable. The original-size stereoscopic image is displayed by an operation by the viewer indicating an allowance, so that it is also possible to allow the stereoscopic image work to be viewed as intended by a producer.

Moreover, a stereoscopic image generating device of the present invention comprises a means for detecting information indicating stereoscopic effect intensity added to a stereoscopic image to be displayed, a means for displaying a stereoscopic image by rendering a stereoscopic effect weaker than an original stereoscopic effect based on the information indicating the stereoscopic effect intensity of the stereoscopic image and requiring an input indicating whether or not to allow a stereoscopic image having the original stereoscopic effect, and a means for executing a display of the stereoscopic image having the original stereoscopic effect when receiving information indicating an allowance from a user side.

With such the configuration, a stereoscopic image is displayed by rendering a stereoscopic effect weaker than its original stereoscopic effect at first. As a result, even if a stereoscopic image has an intense stereoscopic effect, its stereoscopic effect is rendered weak, and it is possible to prevent a viewer from feeling uncomfortable. The image having an original stereoscopic effect is displayed by an operation by the viewer indicating an allowance, so that it is also possible to allow the stereoscopic image work to be viewed as intended by a producer.

Furthermore, a stereoscopic image generating device according to the present invention comprises a means for determining stereoscopic effect intensity of a stereoscopic image to be displayed, a means for displaying a stereoscopic image by rendering a size smaller than an original-size based on the determined stereoscopic effect intensity and requiring an input indicating whether or not to allow an original-size stereoscopic image, and a means for executing a display of the original-size stereoscopic image when receiving information indicating an allowance from a user side.

Moreover, a stereoscopic image generating device of the present invention comprises a means for determining stereoscopic effect intensity of a stereoscopic image to be displayed, a means for displaying a stereoscopic image by rendering a stereoscopic effect weaker than an original stereoscopic effect based on the determined stereoscopic intensity and requiring an input indicating whether or not to allow a stereoscopic image having the original stereoscopic effect, and a means for executing a display of the stereoscopic image having the original stereoscopic effect when receiving information indicating an allowance from a user side.

With such the configurations, even if no information indicating stereoscopic effect intensity is added to a stereoscopic image, it is possible to exhibit the same effect as that described above.

In addition, a stereoscopic image generating device according to the present invention comprises a means for displaying a stereoscopic image to be displayed by rendering a size smaller than its original-size and requiring an input indicating whether or not to allow an original-size stereoscopic image, and a means for executing a display of the original-size stereoscopic image when receiving information indicating an allowance from a user side.

Moreover, a stereoscopic image generating device of the present invention comprises a means for displaying a stereoscopic image to be displayed by rendering a stereoscopic effect weaker than its original stereoscopic effect and requiring an input indicating whether or not to allow the stereoscopic image having the original stereoscopic effect, and a means for executing a display of the stereoscopic image having the original stereoscopic effect when receiving information indicating an allowance from a user side.

With such the configurations, even if no information indicating stereoscopic effect intensity is added to a stereoscopic image, and besides, there is no means for determining the stereoscopic effect intensity, it is possible to exhibit the same effect as that described above.

Moreover, in any one of the above-described stereoscopic image generating devices, it is preferable, in a state of a size-reduced display or in a state of a stereoscopic effect-weakened display, to perform a display indicating warning on a screen.

Furthermore, a stereoscopic image delivery method of the present invention is characterized in transmitting a stereoscopic image by rendering a size smaller than its original size, requiring an input indicating whether or not to allow an original-size stereoscopic image, and transmitting the original size stereoscopic image when receiving information indicating an allowance from a user side.

In addition, a stereoscopic image delivery method of the present invention is characterized in transmitting a stereoscopic image by rendering a stereoscopic effect weaker than its original stereoscopic effect, requiring an input indicating whether or not to allow a stereoscopic image having an original stereoscopic effect, and transmitting the stereoscopic image having the original stereoscopic effect when receiving information indicating an allowance from a user side.

With such the configurations, in a case that a stereoscopic image exists as an image of an HTML file on an Internet browsing, for example, the stereoscopic image is displayed as an image, of which size is rendered smaller than an original size, or an image of which stereoscopic effect is rendered weaker than an original stereoscopic effect at first. As a result, even if a stereoscopic image work has an intense stereoscopic effect, its stereoscopic effect is rendered weak, and it is possible to prevent a viewer from feeling uncomfortable. The image having an original stereoscopic effect is displayed by an operation by the viewer indicating an allowance, so that it is also possible to allow the stereoscopic image work to be viewed as intended by a producer. In addition, in a receiving-side device, which is a computer or a mobile telephone that performs the Internet browsing, a means for detecting information indicating the stereoscopic effect or a means for determining the stereoscopic effect are unnecessary, and moreover, it is also unnecessary to perform a reducing process of the stereoscopic image and a changing process of the stereoscopic effect.

BEST MODE FOR PRACTICING THE INVENTION

Hereinafter, a stereoscopic image reproducing device will be described referring to FIGS. 1 to 5.

Generation of a stereoscopic image by a two-dimensional image and a depth map (depth information) will be described based on FIG. 1. It is noted that, in FIG. 1, a system will be described as the system that is composed of a transmitting-side device 1 structured as a broadcast station, a server on the Internet, or the like, and a receiving-side device 2 including a personal computer, a mobile telephone, or the like, equipped with a broadcast receiver and an Internet connection environment.

Figure 1:
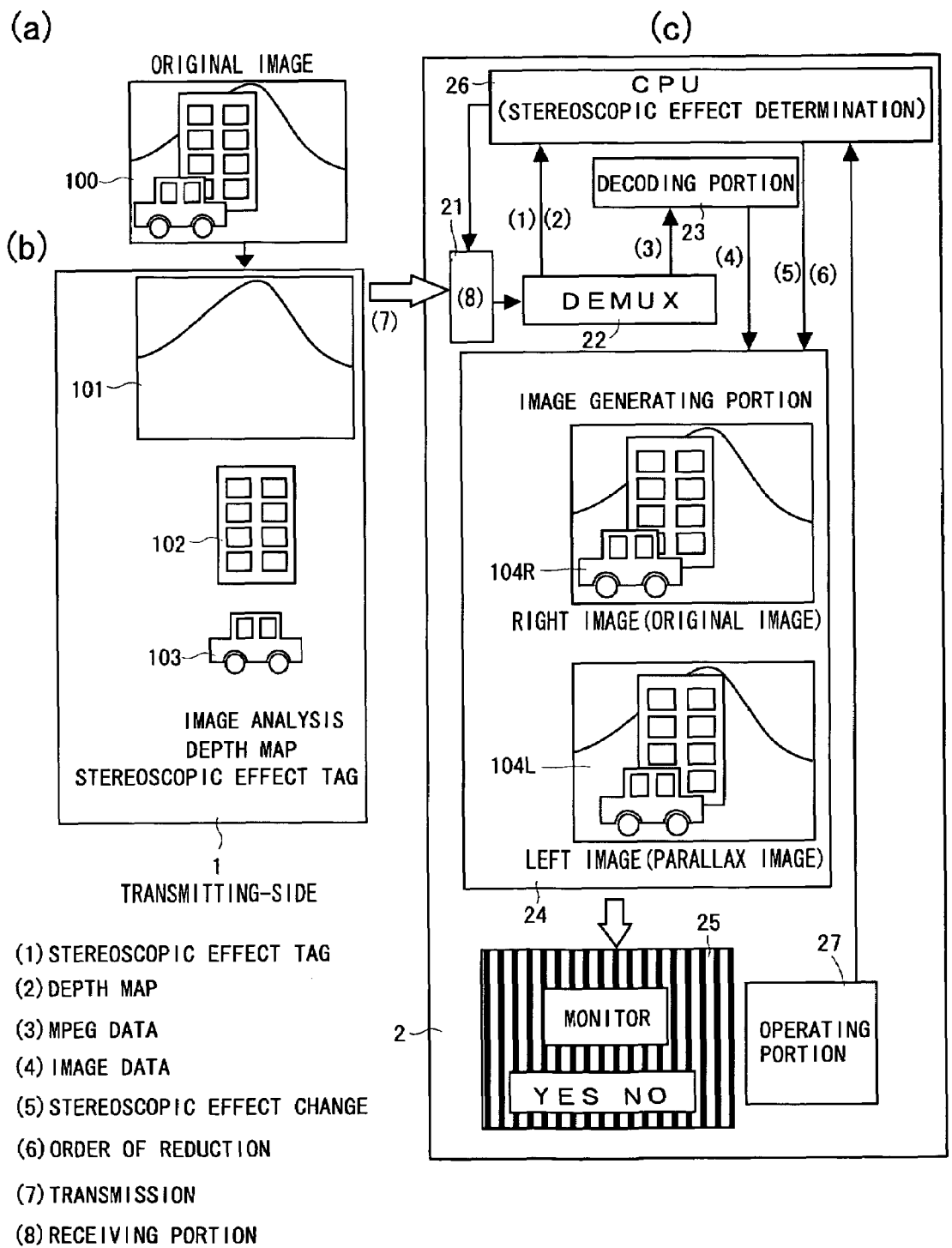
FIG. 1 is a descriptive diagram showing a delivery of a stereoscopic image and a structure of a receiving-side device of an embodiment of the present invention.

A portion indicated by (a) in FIG. 1 shows a photographed two-dimensional image 100. The transmitting-side device 1 performs an image analysis toward the two-dimensional image 100, and extracts a background image 101, an image 102 of a building, and an image 103 of an automobile as shown in a portion indicated by (b) in FIG. 1. These extracted images are handled as objects (for example, edge information). Moreover, a depth value is applied for each dot and the depth map is generated. It is noted that it is also possible to apply the depth value for each object. The depth value may be applied automatically (presumptively), or may be applied by a manual procedure.

Thus, the transmitting-side device 1, in providing (transmitting, broadcasting) the image, transmits the depth map as additional information of the image. Furthermore, in this embodiment, a stereoscopic effect tag is also transmitted as the additional information of the image. The stereoscopic effect tag indicates intensity of the stereoscopic effect, and the intensity is indicated by a numerical value such as 0, 1, 2, or 3, for example. In a case of a digital broadcasting, multiplex broadcasting is possible by multiplexing image data and various kinds of additional information on one transport stream. In a delivery using a computer network, too, the multiplex broadcasting is possible by multiplexing the image data and various kinds of additional information on one transport stream.

As shown in a portion indicated by (c) in FIG. 1, the receiving-side device 2 receives each of the data including the background image 101, the image 102 of the building, the image 103 of the automobile, and also the depth map and the stereoscopic effect tag. If these data are multiplexed, a demultiplexing (DEMUX) process is performed. As a decoding process on the image data, basically, a process based on an MPEG, for example, and the like is adopted. In addition, the receiving-side device 2 generates an image for a right eye 104R and an image for a left eye 104L to which parallax is applied on the basis of each image data of the background image 101, the image 102 of the building, the image 103 of the automobile, and the depth map. Therefore, the receiving-side device 2 is equipped with a receiving portion 21 (a modem, a tuner, and the like) for receiving data, a demultiplexer 22 (DEMUX), a decoding portion 23, an image generating portion 24 for generating a parallax vision image on the basis of data of the two-dimensional image and the depth map, a monitor 25, and others. Needless to say, a CPU 26 for controlling the above-described devices and an operating portion 27 for a user to perform operations (in a case of a broadcasting receiver, a remote control transmitter is provided, and in a case of a personal computer, a mouse and a keyboard, etc., are provided) are provided. It is noted that, in generating a parallax image, a process is performed such that the smaller the depth value of the object is, the larger an amount of horizontal movement (a number of moving dots) is.

The receiving-side device 2, as a result of being equipped with a liquid crystal barrier at a near side position of a monitor, allows performing both a display of a plane vision image and a display of a stereoscopic vision image. If the stereoscopic vision image is formed by alternately arranging the images for the right eye and the images for the left eye in a vertically-striped shape, vertically striped shading areas are formed in the liquid crystal barrier by a control of the CPU 26. Moreover, when the stereoscopic vision image is displayed in a part of areas on a screen (a window portion in reproducing a file, or a part of an image portion in an HTML file), the CPU 26, on the basis of displaying coordinates and sizes of the window portion and the part of the image portion, controls a size of the vertically-striped shading areas and a formation position thereof. It is noted that, not only the stereoscopic vision image alternately arranging the image for the right eye and the image for the left eye in vertically-striped shape, but the stereoscopic vision image obliquely arranging the image for the right eye and the image for the left eye (see Japanese Patent Publication No. 3096613) may be adopted. In this case, an oblique barrier is formed in the liquid crystal barrier.

The CPU 26 of the receiving-side device 2 receives the stereoscopic effect tag attached to the stereoscopic image to be displayed from the demultiplexer 22, and executes an image display controlling process based on the stereoscopic effect tag. Hereinafter, the image display controlling process will be described.

Figure 2:
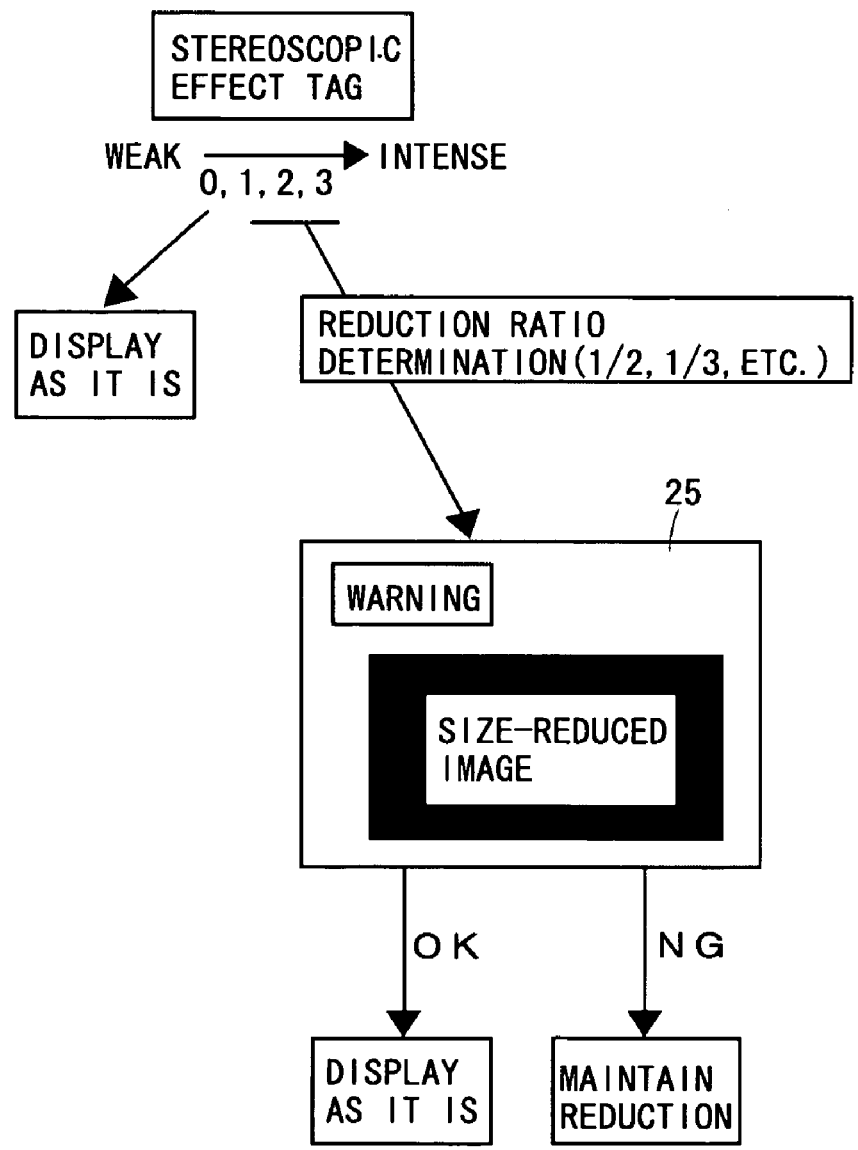
FIG. 2 is a descriptive diagram describing a process content of the receiving-side device.

As shown in FIG. 2, when "0" indicating that the intensity of the stereoscopic effect is the lowest is applied as the stereoscopic effect tag, the stereoscopic image is allowed to be displayed as it is. On the other hand, when "1", "2", and "3" are applied as the stereoscopic effect tag, the CPU 26 determines a reduction ratio depending on a value of the stereoscopic effect tag (one-half, one-third, etc.). It is noted that a certain fixed reduction ratio may be set. Then, the reduction ratio is applied to the image generating portion 24. The image generating portion 24 is equipped with a scaler function for controlling the size of a displayed image, and displays a reduced image using this function. Moreover, the CPU 26 issues a command of generating letters of "warning" to an OSD (on-screen display) circuit which is not shown. A bit map data constituting the letters of "warning" generated by the OSD circuit is combined to be the image data by the image generating portion 24. As a result, as shown in FIG. 2, a reduced stereoscopic image and the letters of "warning" are displayed on the monitor 25. A user selects whether to display the stereoscopic image according to a producer's intention or to maintain the size-reduced stereoscopic image. This selection, in a case that an OSD display explaining, for example, "operate "1" to select for displaying the original image (OK), operate "2" to select for maintaining the size-reduced image (NG)" is displayed on the screen, is performed by operating an operation portion 27 according to the explanation. It is noted that such a process is adaptable to the stereoscopic image composed of the image for the right eye and the image for the left eye.

Figure 3:
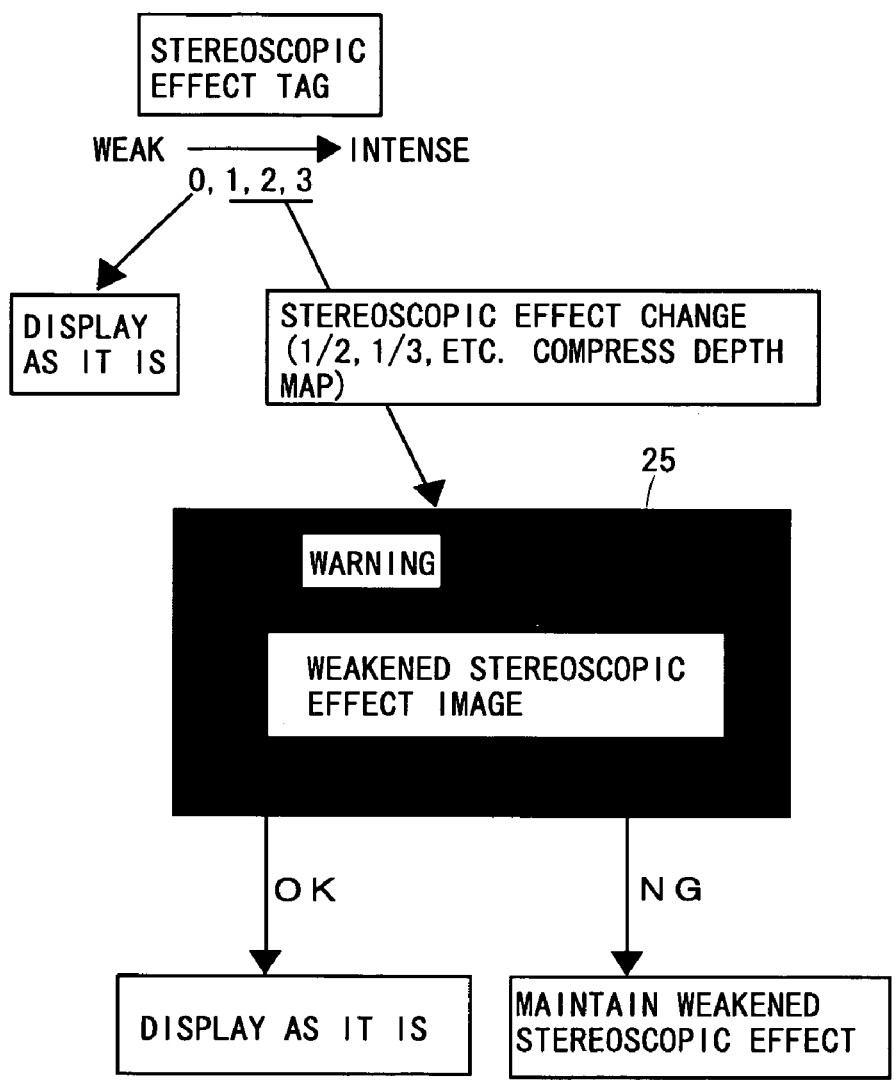
FIG. 3 is a descriptive diagram describing a process content of the receiving-side device.

Furthermore, as shown in FIG. 3, if "0" indicating that the intensity of the stereoscopic effect is the lowest is applied as the stereoscopic effect tag, the stereoscopic image is allowed to be displayed as it is. On the other hand, if "1", "2", and "3" are applied as the stereoscopic effect tag, the CPU 26 changes (compresses) the depth map data in response to a value of the stereoscopic effect tag (one-half, one-third, etc.). Moreover, this weakened stereoscopic effect depth map data is applied to an image generating portion 24. The image generating portion 24 generates the parallax image on the basis of the weakened stereoscopic depth map data. Furthermore, the letters of "warning" are displayed by the OSD circuit. As a result, as shown in FIG. 3, a weakened stereoscopic effect image and the letters of "warning" are displayed on the monitor 25. The user selects whether to display of the stereoscopic image according to a producer's intention or to maintain the weakened stereoscopic effect image. This selection, in a case that the OSD display explaining, for example, "operate "1" to select for displaying the original image (OK), operate "2" to select for maintaining the weakened stereoscopic effect image (NG)" is displayed on the screen, is performed by operating the operating portion 27 according to the explanation.

Figure 4:
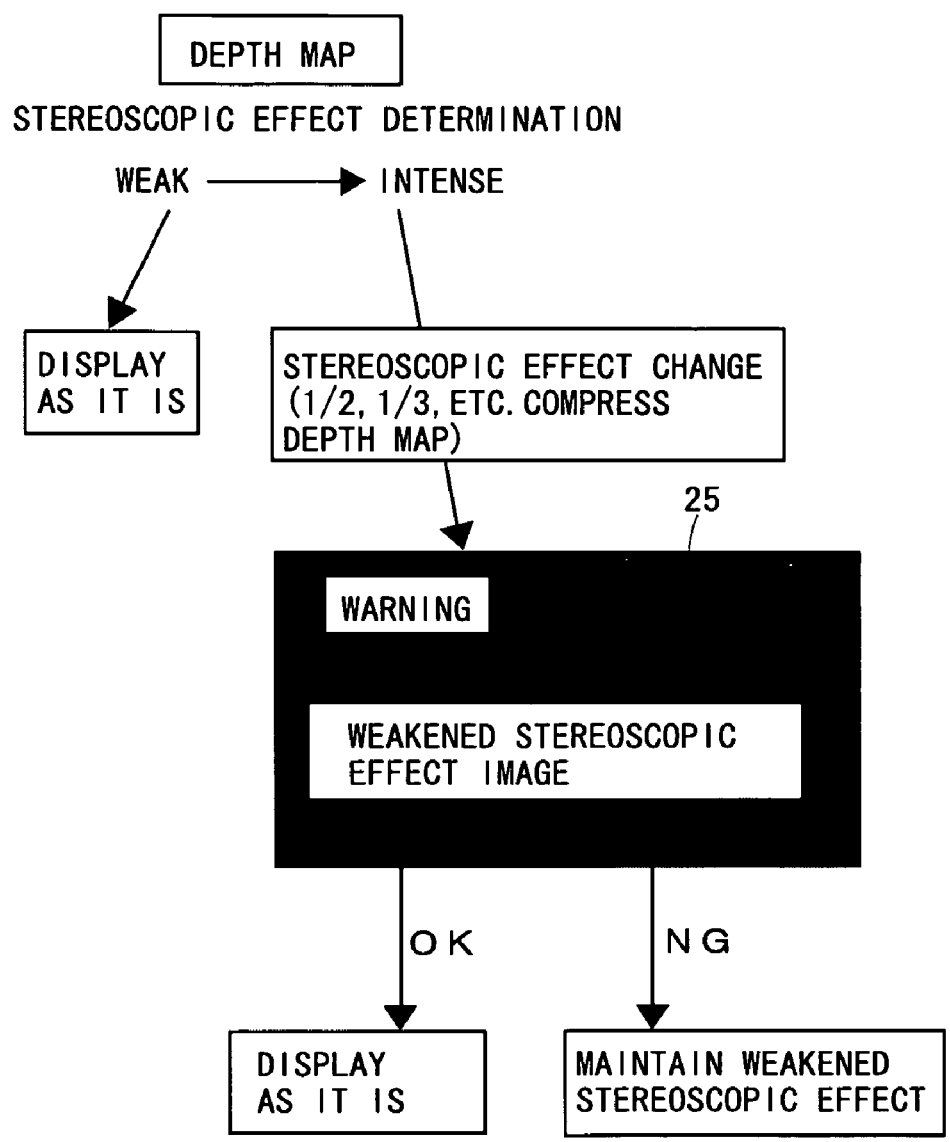
FIG. 4 is a descriptive diagram describing a process content of the receiving-side device.

Moreover, as shown in FIG. 4, in a case that the stereoscopic effect tag does not exist and only the depth map is received, the stereoscopic effect is determined on the basis of the depth map. For example, by relying on a difference between a maximum value and a minimum value of depth map values applied to each dot and the object forming the image, it is possible to determine the stereoscopic effect. When the difference is larger than a threshold value set in advance, the stereoscopic effect is judged to be intense and the difference is smaller than the threshold value set in advance, the stereoscopic effect is judged to be weak. When the stereoscopic effect is judged to be weak, the stereoscopic image is displayed as it is. Meanwhile, when the stereoscopic effect is judged to be intense, the depth map is changed (compressed) (one-half, one-third, etc.) according to an extent (depth map value). Then, this weakened stereoscopic effect depth map data is applied to the image generating portion 24. The image generating portion 24 generates the parallax image based on the weakened stereoscopic effect depth map data. Moreover, the letters of "warning" are displayed on the screen by the OSD circuit. As a result, as shown in FIG. 4, the weakened stereoscopic effect image and the letters of "warning" are displayed on the monitor 25. The user selects whether to display the stereoscopic image according to a producer's intention or to maintain the weakened stereoscopic effect image. This selection, in a case that the OSD display explaining, for example, "operate "1" to select for displaying the original image (OK), operate "2" to select for maintaining the weakened stereoscopic effect image (NG)" is displayed on the screen, is performed by operating the operating portion 27 according to the explanation.

Figure 5:
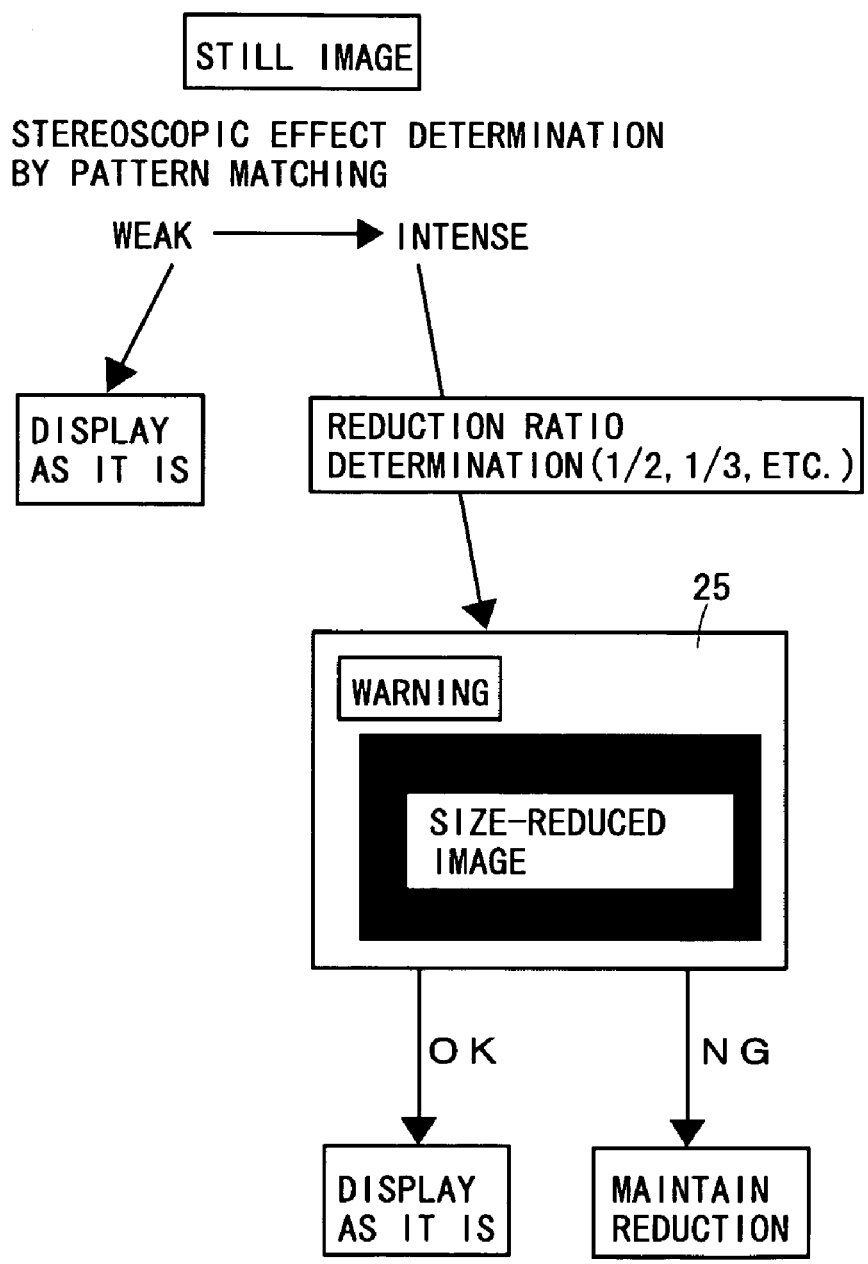
FIG. 5 is a descriptive diagram describing a process content of the receiving-side device.

Furthermore, as shown in FIG. 5, regarding a still image, intensity of the stereoscopic effect is determined by a pattern matching. For example, in receiving the image for the right eye and the image for the left eye, a deviation amount (shift amount) of dots or objects corresponding to these images is detected and the intensity of the stereoscopic effect is determined on the basis of the deviation amount. The CPU 26 decides a reduction ratio according to the determined intensity of the stereoscopic effect (one-half, one-third, etc.). It is noted that a certain fixed reduction ratio may be set. Then, the reduction ratio is applied to the image generating portion 24. The image generating portion 24 displays the size-reduced image. In addition, the letters of "warning" are displayed on the screen by the OSD circuit. As a result, as shown in FIG. 5, the size-reduced stereoscopic image and the letters of "warning" are displayed on the monitor 25. The user selects whether to display the stereoscopic image according to a producer's intention or to maintain the size-reduced stereoscopic image. This selection, in a case that the OSD display explaining "operate "1" to select for displaying the original image (OK), operate "2" to select for maintaining the size-reduced image (NG)", for example, is displayed on the screen, is performed by operating an operation portion 27 according to the explanation.

In the above description, a size of the image to be displayed on the monitor 25 is decided by the number of dots of the image, a display resolution (pixel per inch, dot per inch) of the monitor 25, and a setting value of the display resolution (a screen mode, the number of displayed dots). The display image of which size is decided as such is the original-size display image. Furthermore, if such a process as to reduce the size of image and to adjust to the size of the screen in a case where the size of image is larger than that of the screen is automatically performed on the basis of a screen setting, the image subjected to such the process is the original-size image. Moreover, similarly in a television set, if an auto wide expansion mode is set, for example, it would be possible to say that the image expanded and displayed in accordance with the setting is an original-size displayed image. In the invention of the present application, the expansion and reduction displays as mentioned above are within a category of original-size display, and the reduction displaying process is performed as a process different from such the expansion and reduction displays. If described more in detail, the reduction display based on the setting value of the display resolution, and others, is executed irrespective of the stereoscopic image display and the plane image display. On the other hand, the reduction displaying process according to the invention of the present application is performed in the stereoscopic image display. In addition, the stereoscopic effect changes according to the setting value of the display resolution, and others. However, such the changed display image becomes an image having the original stereoscopic effect. In the invention of the present application, the change in the stereoscopic effect described above is within the category of the display of original stereoscopic effect, and the display of the weakened stereoscopic effect image is performed separately from such the change in the stereoscopic effect.

In addition, in the above description, though the reduction display and weakened the stereoscopic effect display are performed by the process of the receiving-side device 2, it is possible that such the displays are performed by the process of the transmitting-side. For example, the transmitting-side device 1 that exists as a server on the Internet reduces the size of the stereoscopic image smaller than the original-size and transmits the image as an image on an HTML file, in addition, requires a user to perform an input indicating whether or not allowing the original-size image. At this time, on the monitor 25 of the receiving-side device 2, the size-reduced stereoscopic image is displayed and, for example, a message such as "Please click the original selection (OK) or the size-reduced maintenance selection (NG)" is displayed on the screen. If the user selects (OK) according to this explanation, the original stereoscopic image is transmitted from the transmitting-side device 1.

Moreover, for example, the transmitting-side device 1 that exists as the server on the Internet reduces the stereoscopic effect weaker than the original stereoscopic effect and transmits the stereoscopic image as the image on the HTML file, in addition, requires a user to perform an input indicating whether or not allowing the stereoscopic image having the original stereoscopic effect. At this time, on the monitor 25 of the receiving-side device 2, the weakened stereoscopic effect image is displayed and, for example, a message such as "Please click the original selection (OK) or the weakened stereoscopic effect image maintenance selection (NG)" is displayed on the screen. If the user selects (OK) according to this explanation, the information is transmitted to the transmitting-side device 1. The transmitting-side device 1 determines that a transmission of the original stereoscopic image is allowed (required) and transmits the original stereoscopic image to the receiving-side device 1.

With such the configurations, in a case that a stereoscopic image exists as an image of the HTML file on the Internet browsing, the stereoscopic image is displayed as an image of which size is reduced than the original-size or an image of which stereoscopic effect is weakened than the original stereoscopic effect at first. As a result, even if a stereoscopic image work has an intense stereoscopic effect, its stereoscopic effect is weakened and it is possible to prevent a viewer from feeling uncomfortable. The image having an original stereoscopic effect is displayed by an operation by the viewer indicating an allowance, so that it is possible to allow the stereoscopic image work to be viewed as intended by the producer. In addition, in the receiving-side device 1, which is a computer or a mobile telephone that performs the Internet browsing, a means for detecting the stereoscopic effect tag or a means for determining the stereoscopic effect is unnecessary, moreover, it is also unnecessary to perform a reducing process of the stereoscopic image and a changing process of the stereoscopic effect.

As described above, the present invention enables the viewer to see stereoscopic image work intended by a producer without making the viewer feel uncomfortable toward the stereoscopic image work.

What is claimed is:

1. A stereoscopic image generating device, comprising:
   a detecting portion for detecting information indicating stereoscopic effect intensity added to a stereoscopic image to be displayed;
   a display for displaying a stereoscopic image by rendering a size smaller than an original-size based on said information indicating the stereoscopic effect intensity of the stereoscopic image and requiring an input indicating whether or not to allow an original-size stereoscopic image; and
   an executing portion for executing a display of the original-size stereoscopic image when receiving information indicating an allowance from a user side.

2. A stereoscopic image generating device, comprising:
   a detecting portion for detecting information indicating stereoscopic effect intensity added to a stereoscopic image to be displayed;
   a display for displaying a stereoscopic image by rendering a stereoscopic effect weaker than an original stereoscopic effect based on said information indicating the stereoscopic effect intensity of the stereoscopic image and requiring an input indicating whether or not to allow a stereoscopic image having the original stereoscopic effect; and
   an executing portion for executing a display of the stereoscopic image having the original stereoscopic effect when receiving information indicating an allowance from a user side.

3. A stereoscopic image generating device, comprising:
   a determining portion for determining stereoscopic effect intensity of a stereoscopic image to be displayed;
   a display for displaying a stereoscopic image by rendering a size smaller than an original-size based on said determined stereoscopic effect intensity and requiring an input indicating whether or not to allow an original-size stereoscopic image; and
   an executing portion for executing a display of the original-size stereoscopic image when receiving information indicating an allowance from a user side.

4. A stereoscopic image generating device, comprising:
   a determining portion for determining stereoscopic effect intensity of a stereoscopic image to be displayed;
   a display for displaying a stereoscopic image by rendering a stereoscopic effect weaker than an original stereoscopic effect based on said determined stereoscopic effect intensity and requiring an input indicating whether or not to allow a stereoscopic image having the original stereoscopic effect; and
   an executing portion for executing a display of the stereoscopic image having the original stereoscopic effect when receiving information indicating an allowance from a user side.

5. A stereoscopic image generating device, comprising:
   a display for displaying a stereoscopic image to be displayed by rendering a size smaller than its original-size based on stereoscopic effect intensity of the stereoscopic image and requiring an input indicating whether or not to allow an original-size stereoscopic image; and
   an executing portion for executing a display of the original-size stereoscopic image when receiving information indicating an allowance from a user side.

6. A stereoscopic image generating device, comprising:
a display for displaying a stereoscopic image to be displayed by rendering a stereoscopic effect weaker than its original stereoscopic effect based on stereoscopic effect intensity of the stereoscopic image and requiring an input indicating whether or not to allow the stereoscopic image having the original stereoscopic effect; and
an executing portion for executing a display of the stereoscopic image having the original stereoscopic effect when receiving information indicating an allowance from a user side.

7. A stereoscopic image generating device according to any one of claims 1 to 6, wherein a warning is displayed on a screen in a state of a size-reduced display or in a state of a stereoscopic effect-weakened display.

\* \* \* \* \*